United States Patent
Kothandapani

(10) Patent No.: US 7,707,282 B1
(45) Date of Patent: Apr. 27, 2010

(54) INTEGRATED NETWORK AND MANAGEMENT CONTROLLER

(75) Inventor: Govind Kothandapani, Snellville, GA (US)

(73) Assignee: American Megatrends, Inc., Norcross, GA (US)

( * ) Notice: Subject to any disclaimer, the term of this patent is extended or adjusted under 35 U.S.C. 154(b) by 1286 days.

(21) Appl. No.: 10/879,831

(22) Filed: Jun. 29, 2004

(51) Int. Cl.
*G06F 15/173* (2006.01)

(52) U.S. Cl. .................. 709/224; 709/220; 709/221

(58) Field of Classification Search .......... 709/220, 709/223
See application file for complete search history.

(56) References Cited

U.S. PATENT DOCUMENTS

| | | | |
|---|---|---|---|
| 5,426,421 A * | 6/1995 | Gray | 709/223 |
| 5,535,338 A | 7/1996 | Krause et al. | |
| 5,590,285 A | 12/1996 | Krause et al. | |
| 5,678,006 A * | 10/1997 | Valizadeh et al. | 709/223 |
| 5,870,558 A * | 2/1999 | Branton et al. | 709/224 |
| 6,070,253 A * | 5/2000 | Tavallaei et al. | 714/31 |
| 6,373,841 B1 * | 4/2002 | Goh et al. | 370/389 |
| 6,681,232 B1 * | 1/2004 | Sistanizadeh et al. | 707/104.1 |
| 6,714,977 B1 | 3/2004 | Fowler et al. | |
| 6,804,627 B1 * | 10/2004 | Marokhovsky et al. | 702/182 |
| 6,922,722 B1 * | 7/2005 | Mann et al. | 709/220 |
| 6,971,044 B2 | 11/2005 | Geng et al. | |
| 6,983,324 B1 * | 1/2006 | Block et al. | 709/228 |
| 6,990,518 B1 * | 1/2006 | Secer | 709/223 |
| 7,082,465 B1 | 7/2006 | Martin et al. | |
| 7,120,689 B2 | 10/2006 | Gonsalves et al. | |
| 7,143,153 B1 * | 11/2006 | Black et al. | 709/223 |
| 7,194,665 B2 | 3/2007 | Guick | |
| 7,206,833 B1 | 4/2007 | Sarangam et al. | |
| 7,231,430 B2 | 6/2007 | Brownell et al. | |
| 7,287,072 B1 * | 10/2007 | Dispensa et al. | 709/224 |
| 7,398,401 B2 | 7/2008 | Goud et al. | |
| 2002/0129098 A1 | 9/2002 | Stone et al. | |
| 2002/0152303 A1 * | 10/2002 | Dispensa | 709/224 |
| 2002/0165962 A1 * | 11/2002 | Alvarez et al. | 709/226 |
| 2002/0174207 A1 * | 11/2002 | Battou | 709/223 |
| 2003/0014517 A1 * | 1/2003 | Lindsay et al. | 709/224 |
| 2003/0023709 A1 * | 1/2003 | Alvarez et al. | 709/223 |
| 2003/0028633 A1 * | 2/2003 | Lindsay et al. | 709/224 |
| 2003/0055959 A1 * | 3/2003 | Sato | 709/224 |

(Continued)

OTHER PUBLICATIONS

U.S. Official Action dated Aug. 5, 2008 in U.S. Appl. No. 10/879,826.

(Continued)

*Primary Examiner*—Michael Won
(74) *Attorney, Agent, or Firm*—Hope Baldauff Hartman, LLC

(57) ABSTRACT

An integrated network and management controller and method for operating are disclosed. The network and management controller includes a network processing component that performs network-based functions and filters management data received over a network intended for consumption by the network and management controller. The network and management controller also includes a microcontroller that performs network based functions in conjunction with the network processing component and performs management functions associated with the computer system. The network processing component and the microcontroller are embedded in the network and management controller and are logically connected.

23 Claims, 5 Drawing Sheets

U.S. PATENT DOCUMENTS

| | | |
|---|---|---|
| 2003/0069953 A1* | 4/2003 | Bottom et al. .............. 709/223 |
| 2004/0073830 A1 | 4/2004 | Coteus et al. |
| 2004/0078456 A1 | 4/2004 | Kennedy et al. |
| 2004/0240440 A1 | 12/2004 | Wild, III et al. |
| 2004/0249913 A1 | 12/2004 | Kaufman |
| 2005/0027858 A1* | 2/2005 | Sloth et al. ................. 709/224 |
| 2005/0080887 A1* | 4/2005 | Lee et al. ................... 709/223 |
| 2005/0091360 A1 | 4/2005 | Chen et al. |
| 2005/0267956 A1* | 12/2005 | Huang ........................ 709/223 |
| 2005/0276092 A1 | 12/2005 | Hansen et al. |
| 2006/0095550 A1 | 5/2006 | Nemmaier et al. |

OTHER PUBLICATIONS

Microsoft Computer Dictionary, 5$^{th}$ Edition, 2002, Definition of TCP, TCP/IP, and TCP/IP Stack.

U.S. Official Action dated Feb. 20, 2008 in U.S. Appl. No. 10/879,826.

*IPMI Intelligent Platform Management Interface Specification v. 1.5*, Document Revision 1.1, Feb. 20, 2002, Intel Hewlett-Packard, NEC Dell, 460 pages.

U.S. Official Action dated Jan. 6, 2009 in U.S. Appl. No. 10/879,826.

U.S. Notice of Allowance / Allowability dated Jul. 15, 2009 in U.S. Appl. No. 10/879,826.

* cited by examiner

US 7,707,282 B1

INTEGRATED NETWORK AND MANAGEMENT CONTROLLER

CROSS REFERENCE TO RELATED APPLICATIONS

This application is related to subject matter disclosed in U.S. Pat. No. 7,668,941 for SYSTEMS AND METHODS FOR IMPLEMENTING A TCP/IP STACK AND WEB INTERFACE WITHIN A MANAGEMENT MODULE, which is being filed concurrently herewith, and the subject matter of which is incorporated in this application by reference.

TECHNICAL FIELD

The present invention relates generally to computer platform management, and more particularly, to providing platform management controller functionality within a network controller.

BACKGROUND OF THE INVENTION

Generally, the term "computer system" refers to either a stand-alone system or a plurality of interconnected systems, such as, for instance, a client-server network. Regardless of the implementation, the various components making up a computer system typically operate within a range of parameters defined by performance protocols or standards. For instance, the temperature within a computer chassis is often monitored in order to detect periods in time when the system may rise above a certain predetermined temperature reading. Other forms of information that may be monitored within a computer system include, without limitation, voltages associated with semiconductor components located on the baseboard of the system, velocity (e.g., rpm) of cooling fans located on the baseboard or within the system chassis, and the velocity of spindle motors within hard disk drives or optical drives.

Various types of sensors are being used to detect operating and performance-related parameters associated with a computer system and its constituent components. Referring to the examples provided above, these sensors include thermostats, voltage meters and tachometers. A computer system typically employs one or more stand-alone management modules to assist in the collection and analysis of information sensed by the various sensors measuring operating and performance-related parameters within the system. These management modules may be either software or hardware components, but typically encompass both hardware and software components. One such management module is referred to as a "Baseboard Management Controller" (BMC). The BMC is a stand-alone microcontroller integrated into the baseboard (also known in the industry as the "motherboard") of a computer system and having a specified number of contact pins through which information sensed by various sensors is received for analysis by the BMC. In order to perform this analysis, the BMC is programmed with firmware for implementing procedures relating to system monitoring and recovery. With this firmware, the BMC is programmed to monitor various operating and performance-related parameters sensed within a computer system and to analyze this information to determine whether any of the sensed parameters are currently outside of an expected or recommended operating range, the occurrence of which is commonly referred to as an "event."

Remote computer systems may access events of a host computer by interfacing with the BMC of a host computer system over a network via the network controller of the host computer system. For instance, a remote computer system may transmit data intended for the BMC over the network, such as a request to view a sensed parameter monitored by the BMC of the host computer system. The data is received by the network controller of the host computer which notifies the BMC of the request. The BMC then retrieves the data from the network controller over a system interface, such as a system management (SM) bus. Further, through console redirection the sensor measurements monitored by the BMC may be redirected over a network to a remote computer system via the network controller. The BMC is typically integrated as a stand-alone component on the baseboard of a computer system, and therefore, it is generally dedicated to monitoring and controlling the computer system components. Unfortunately, equipping a computer system with a stand-alone BMC occupies valuable space on the motherboard and necessitates the added cost of the BMC. Further, passing network communications data intended for the BMC over a system interface, such as a system management bus may also necessitate slower communication or data transmission speeds.

SUMMARY OF THE INVENTION

Embodiments of the present invention address these problems and others by providing an integrated network and management controller ("NMC"). The NMC can provide the functionality of both a BMC and a network controller, thereby saving the motherboard space used by one of these components. The NMC performs both management functions and network functions such as send and receive operations. The NMC may be communicatively connected to a system interface connected to sensor monitoring devices.

One embodiment of the invention is a NMC for use in monitoring operations associated with a computer system. The NMC includes a network processing component for performing network based functions and filtering management data received. The NMC also includes a microcontroller for performing management functions associated with the computer system. The network processing component and the microcontroller are logically connected within the NMC.

Another embodiment of the invention may be an apparatus for performing network based functions and management functions within a computer system. The apparatus includes a network controller including a network processing component and a microcontroller, wherein the microcontroller is embedded within the network controller. The microcontroller executes management firmware for use in performing management functions and performs network based functions in conjunction with the network processing component embedded in the network controller. The microcontroller also communicates with components of the computer system via a system interface, receives management data filtered from the network processing component, and responds to the management data received.

Still another embodiment of the invention is a method for operating a NMC within a computer system. The method involves establishing a communications path for management data received over a network, receiving the management data over the network at a network processing component of the NMC, and passing the management data from the network processing component to a microcontroller integrated onto the NMC via the communication path.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

Figure 1:
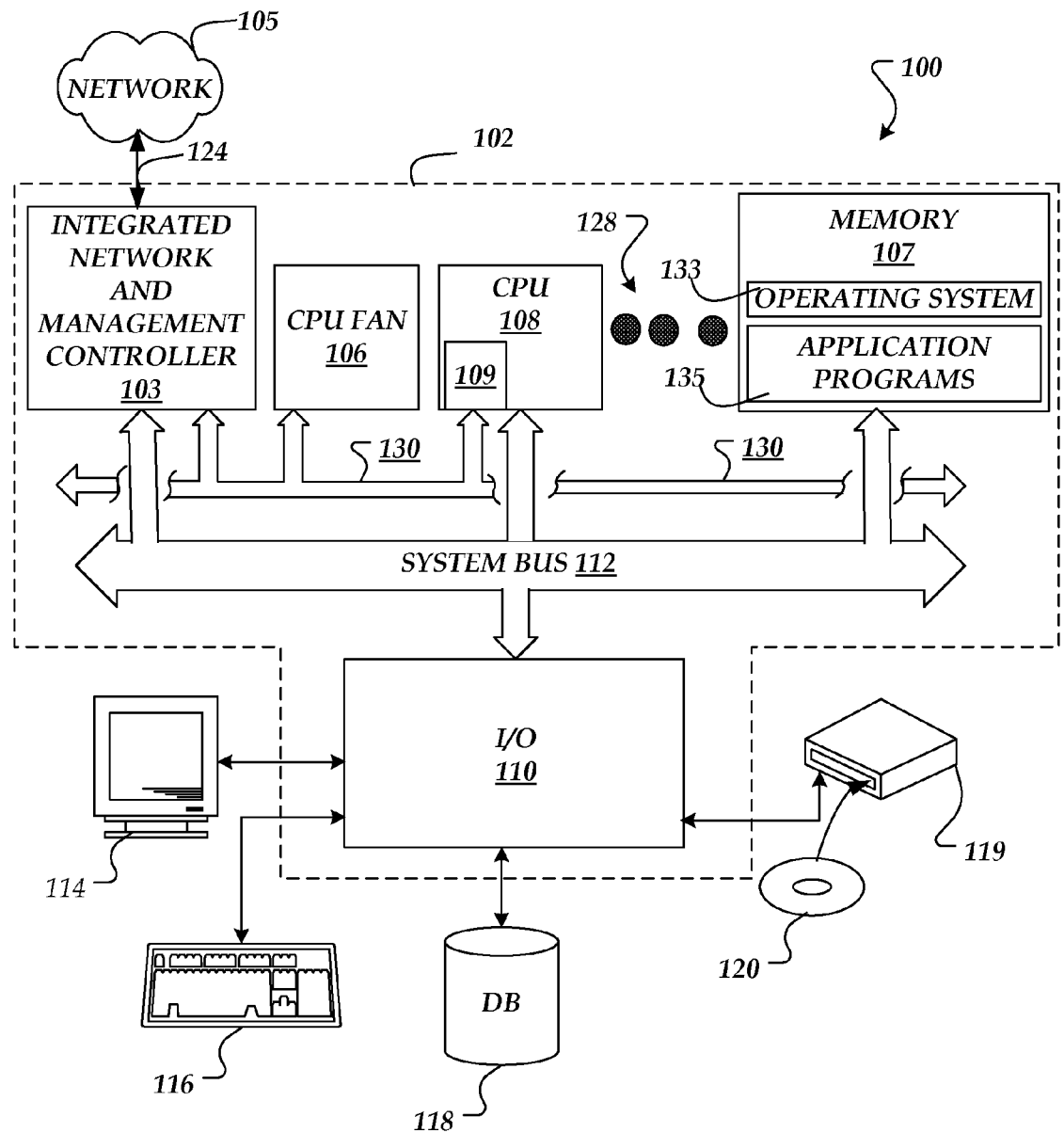

Having thus described the invention in general terms, reference will now be made to the accompanying drawings, which are not necessarily drawn to scale, and wherein:

FIG. 1 depicts a computer system in which an integrated network and management controller performs management and network tasks of the computer system in accordance with an embodiment of the present invention.

Figure 2:
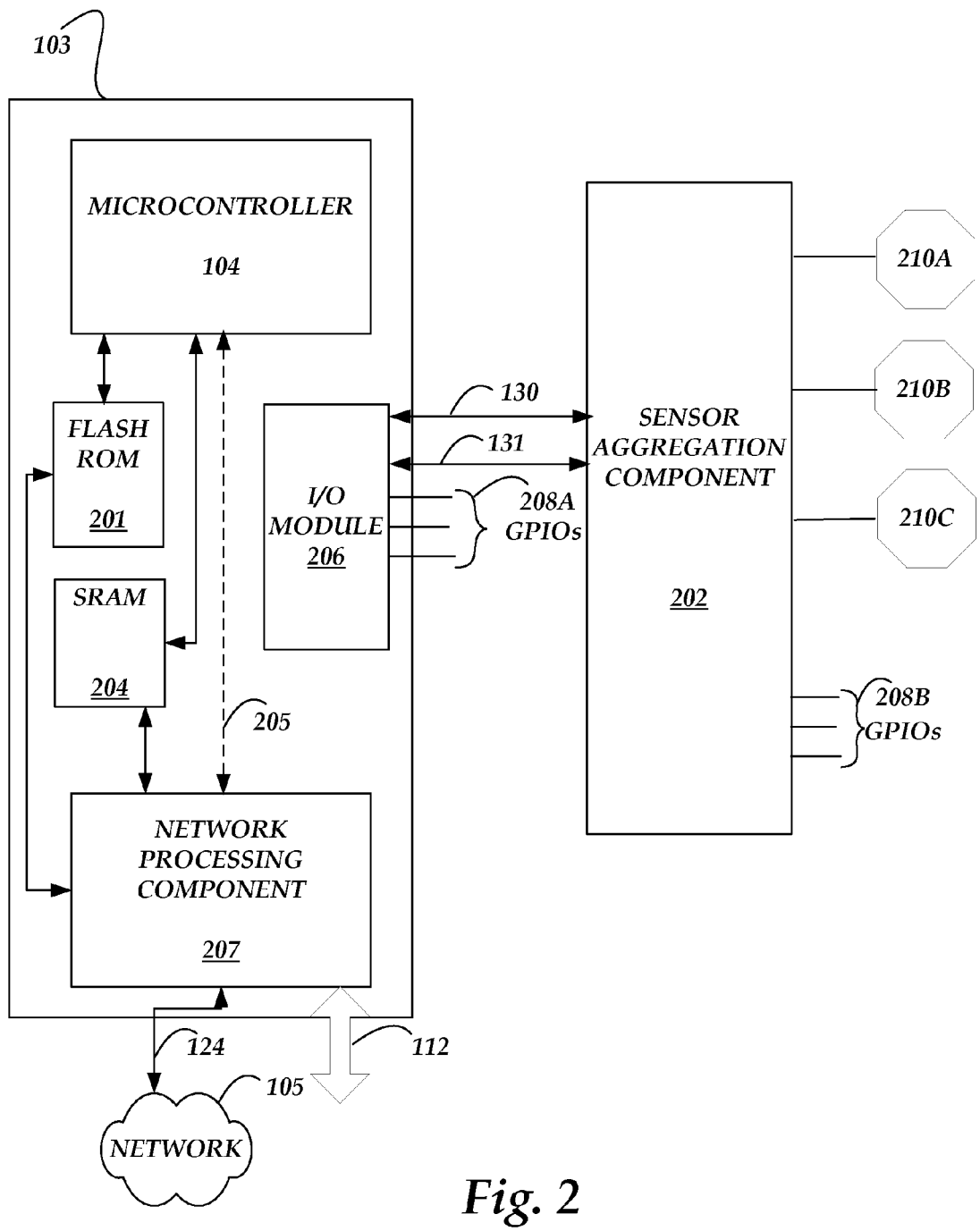

FIG. 2 depicts a block diagram of the network and management controller of FIG. 1 illustrating components embedded within the network controller and a logical configuration of components communicatively connected to the network controller in accordance with an embodiment of the present invention.

Figure 3:
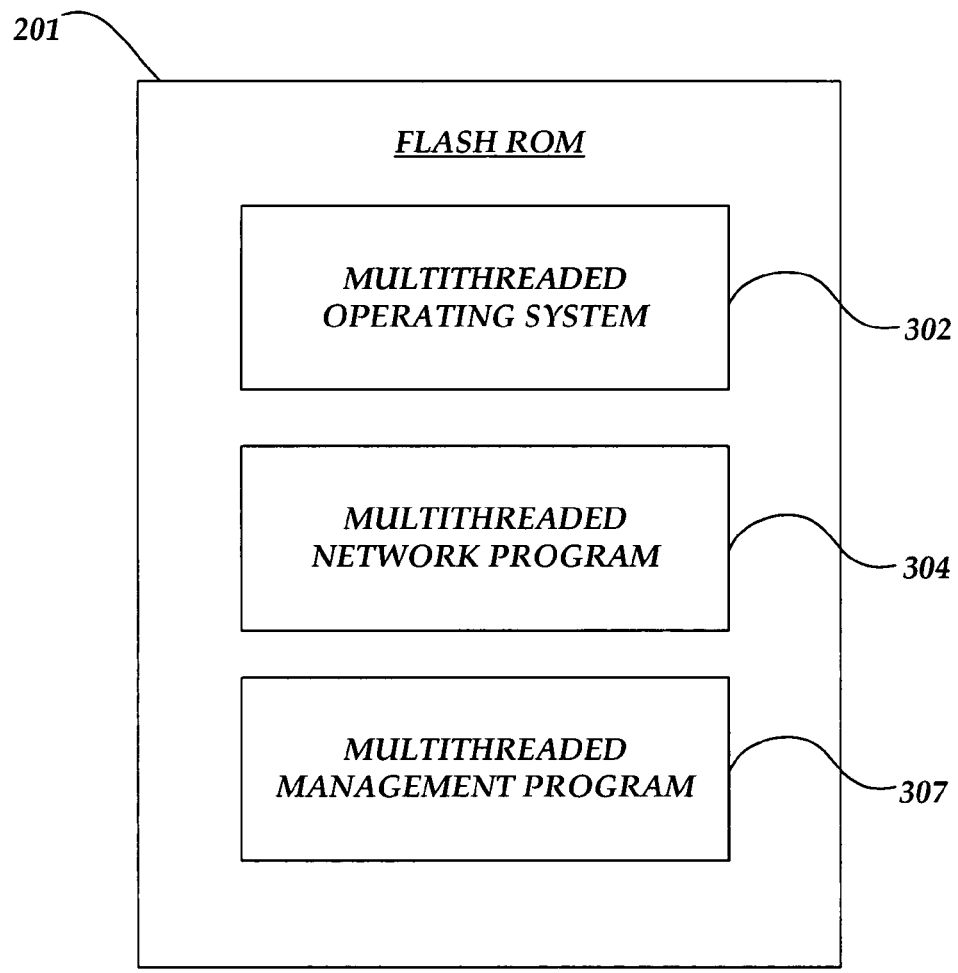

FIG. 3 shows a block diagram illustrating code contents of the flash ROM component of FIG. 2 within the network and management controller in accordance with an embodiment of the present invention.

Figure 4:
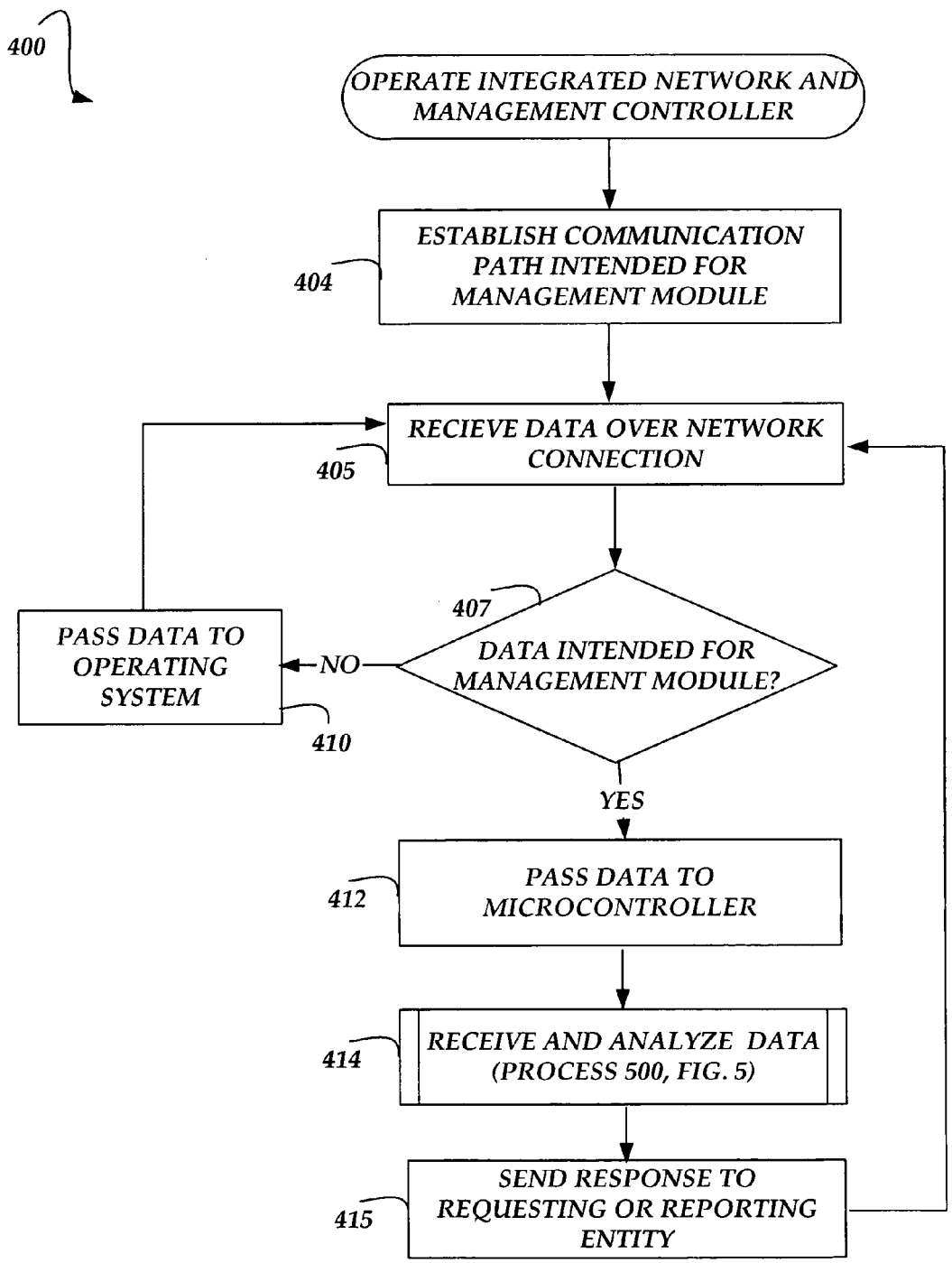

FIG. 4 is a flow diagram illustrating the operation of an integrated network and management controller within the computer system of FIG. 1 in accordance with an embodiment of the present invention.

Figure 5:
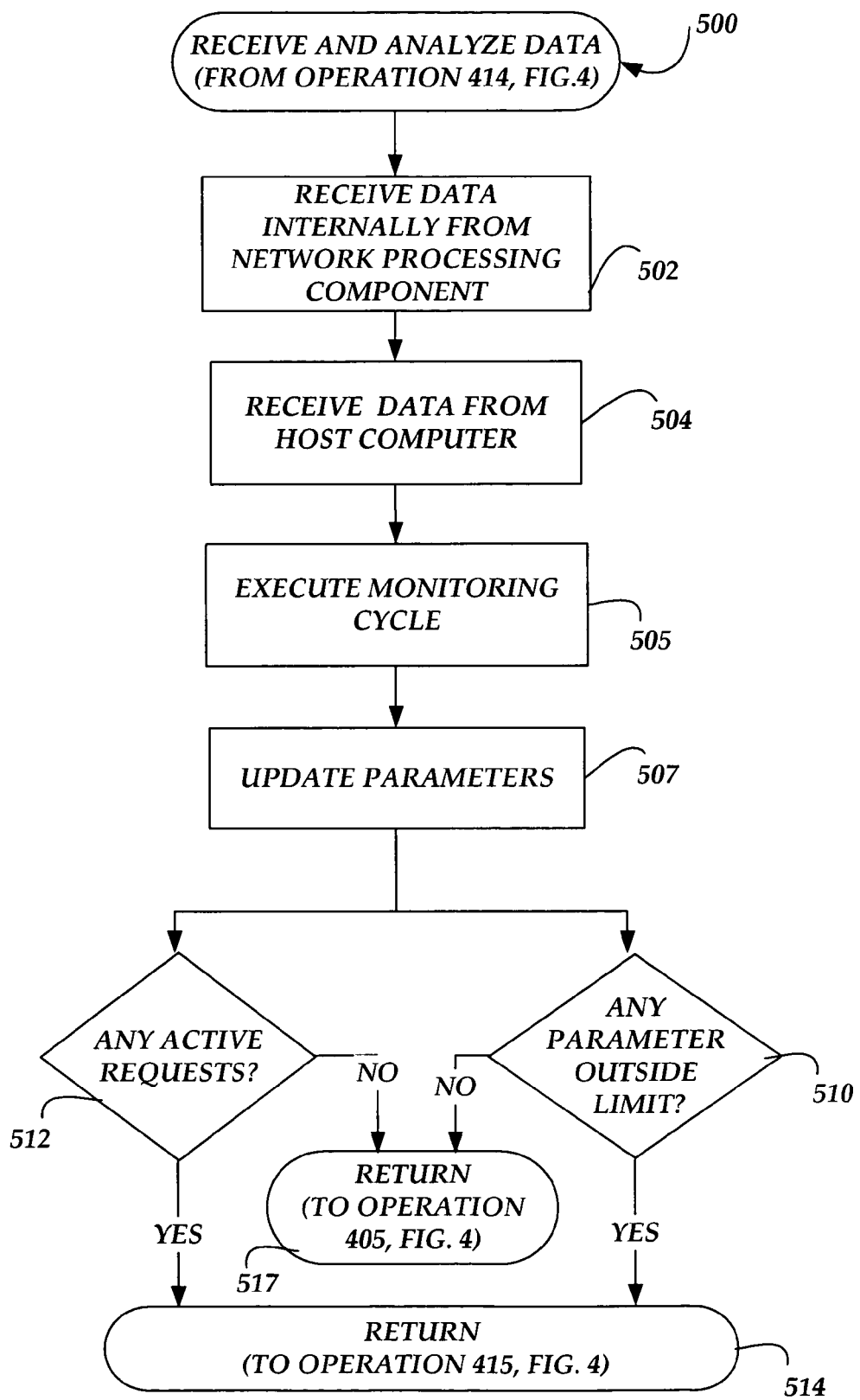

FIG. 5 is a flow diagram that illustrates operational characteristics for receiving and analyzing data at the integrated network and management controller for use in monitoring and controlling operations associated with the computer system of FIG. 1 in accordance with an embodiment of the present invention.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a conceptual illustration of an environment associated with the present invention is shown in accordance with an embodiment of invention. FIG. 1 shows a computer system 100, and more specifically a stand-alone, general purpose computer system. It should be appreciated that the computer system 100 may alternatively be a "special purpose" computer system or a system that incorporates more than one interconnected system, such as a client-server network. Indeed, the computer system 100 of FIG. 1 only represents an exemplary embodiment of the present invention, and therefore, should not be considered to limit the invention in any manner.

The central intelligence of the computer system 100 is a baseboard 102, or "motherboard", which is a printed circuit board to which a multitude of components or devices may be connected by way of a system bus 112 or other electrical communication path (not shown). In an embodiment, these components include, without limitation, a central processing unit (hereinafter "CPU") 108, memory 107, an input/output module 110, and an integrated network and management controller ("NMC") 103. It is also contemplated that the system bus 112 may include other components that are not explicitly shown in FIG. 1. As such, repetition dots 128 illustrate the possible connection of these other components to the system bus 112. The layout of components, and the manner in which the components' are interconnected, on the baseboard 102 is herein referred to as the "configuration" of the baseboard 102.

The system bus 112 provides a two-way communication path for all components connected to the system bus 112. The component that initiates a communication on a bus is referred to as a "master" component and the component to which the initial communication is sent on the bus is referred to as a "slave" component. A master component therefore issues an initial command to or initially requests information from a slave component. Each slave component is addressed, and thus communicatively accessible to master components, by a particular slave address. Both master components and slave components are operable to transmit and receive communications over the system bus 112. Buses and the associated functionality of master-slave communications are well-known to those skilled in the art, and therefore not discussed in further detail herein.

The CPU 108 is a standard central processor that performs arithmetic and logical operations necessary for the operation of the computer system 100. CPUs are well-known in the art, and therefore not described in further detail herein. Like many electrical components, the CPU 108 dissipates heat while operating. As such, a CPU fan 106 is used to cool off the CPU 108 after the CPU 108 reaches a prescribed temperature. Such a determination, i.e., whether the CPU 108 exceeds a prescribed temperature, is made by the NMC 103, which is communicatively coupled by way of a management bus 130 (described in the following paragraph) to a CPU temperature sensor 109 and the CPU fan 106 to provide monitoring functionality over the temperature sensor 109 and control functionality over the CPU fan 106. As described in greater detail below, the NMC 103 may be connected to many other devices for monitoring operation of the components of the computer 100.

In general, the NMC 103 monitors operation of the computer system 100. In a more specific embodiment, the NMC 103 monitors health-related aspects associated with the computer system 100, such as, but not limited to, the temperature of one or more components of the computer system 100, speed of rotational components (e.g., spindle motor, CPU Fan, etc.) within the system, the voltage across or applied to one or more components within the system 100, and the available or used capacity of memory devices within the system 100. To accomplish these monitoring functions, the NMC 103 is communicatively connected to one or more components by way of a system interface such as the management bus 130. In an embodiment, these components include sensor devices for measuring various operating and performance-related parameters within the computer system 100. The sensor devices may be either hardware or software based components configured or programmed to measure or detect one or more of the various operating and performance-related parameters. Like the system bus 112, the component that initiates communication on a bus is referred to a master and the component to which the communication is sent is referred to a slave. As such, the NMC 103 functions as the master on the management bus 130 in most circumstances, but may also function as either a master or a slave in other circumstances. Each of the various components communicatively connected to the NMC 103 by way of the management bus 130 is addressed using a slave address.

The management bus 130 is used by the NMC 103 to request and/or receive various operating and performance-related parameters from one or more components, which are also communicatively connected to the management bus 130. In the embodiment of FIG. 1, the management bus 130 communicatively connects the NMC 103 to the CPU temperature sensor 109 and the CPU fan 106, thereby providing a means for the NMC 103 to monitor and/or control operation of these components. As with the system bus 112, the management bus 130 may include components other than those explicitly shown in FIG. 1. Exemplary components not shown in FIG. 1 may include, without limitation, tachometers, heat sensors, voltage meters, amp meters, and digital and analog sensors. In an embodiment, the management bus 130 is an $I^2C$ bus, which is manufactured by PHILIPS SEMICONDUCTORS and described in detail in the $I^2C$ bus Specification, version 2.1 (January 2000).

The NMC 103 adheres to the Intelligent Platform Management Interface (IPMI) industry standard for system monitoring and event recovery. The IPMI standard is well-known to those of ordinary skill in the industry, and therefore not described in detail herein. Rather, revision 1.0 of the IPMI Specification, version 2.0, published Feb. 12, 2004, is incorporated herein by reference.

The NMC 103 monitors operating and performance-related parameters received from various components of the computer system 100 in order to determine whether an "event" is occurring within the system 100. In an embodiment, these components may be either directly or indirectly connected to the baseboard 102. For example, with respect to the configuration shown in FIG. 1, the NMC 103 monitors operation of the CPU 108 (by way of the CPU temperature sensor 109) and the CPU fan 106 to determine whether certain operating or performance related parameters exceed or fall below prescribed threshold ranges of operation. An example of such an event may be the temperature reading of heat dissipated by the CPU 108 reaching in excess of 145 degrees Fahrenheit.

In accordance with another embodiment of the invention, the NMC 103 may also control one or more components of the computer system 100 in response to the occurrence of an event. Referring back to the example above, the NMC 103 may initiate operation of the CPU fan 106 upon determining that the temperature dissipated by the CPU 108 has reached 146 degrees Fahrenheit. In addition, it is also contemplated that the NMC 103 may also be connected to and receive sensed information from components connected directly to a contact pin 208 (FIG. 2) of the NMC 103 or indirectly by way of a bus (e.g., system bus 112) other than the management bus 130.

The NMC 103 is also capable of connecting the computing system 100 to a network 105 of remote computers via a network link 124. Examples of such systems include SPARC systems offered by SUN MICROSYSTEMS, INC., personal computers offered by IBM CORPORATION and by other manufacturers of IBM-compatible personal computers, and other systems running a UNIX-based or other operating system. A remote computer may be a desktop computer, a server, a router, a network PC (personal computer), a peer device or other common network node, and typically includes many or all of the elements described above relative to the computing system 100. Logical connections may include a local area network (LAN) or a wide area network (WAN). Such networking environments are commonplace in offices, enterprise-wide computer networks, intranets, and the Internet.

The input/output module 110 may be used as a communication medium between any number and type of peripheral devices and the system bus 112. Communications destined for the CPU 108, the NMC 103 or any other component coupled to the system bus 112 and issued by a peripheral device may need to pass through the input/output module 110 to the system bus 112 and then to the necessary component. Exemplary peripheral devices are shown in FIG. 1 and described below.

In the embodiment of FIG. 1, the input/output module 110 is connected to a user input module 116, e.g., a keyboard, a display unit 114 and one or more program storage devices, such as, without limitation, the disk storage unit 118 and the disk drive unit 119. The user input module 116 is shown as a keyboard, but may also be any other type of apparatus (e.g., joystick, mouse, etc.) for inputting commands into the CPU 108 or the microcontroller 104. In accordance with one embodiment, the disk drive unit 119 is a CD-ROM driver unit capable of reading the CD-ROM medium 120, which typically contains programs and data. In accordance with an alternative embodiment, the disk drive unit 119 may be replaced or supplemented by a floppy drive unit, a tape drive unit, or other storage medium drive unit.

In accordance with yet another embodiment, the computing system 100 further comprises an operating system 133 and usually one or more application programs 135. Such an embodiment is familiar to those of ordinary skill in the art. The operating system 133 comprises a set of programs that control operations of the computing system 100 and allocation of resources. The set of programs, inclusive of certain utility programs, may also provide a graphical user interface to the user. An application program 135 is software that runs on top of the operating system software and uses computer resources made available through the operating system 133 to perform application specific tasks desired by the user. In accordance with an embodiment, the operating system 133 employs a graphical user interface wherein the display output of an application program is presented in a rectangular area on the screen of the display device 114. The operating system 133 is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT" operating systems, IBM's OS/2 WARP, APPLE's MACINTOSH OSX operating system, LINUX, UNIX, etc.

Referring now to FIG. 2, a block diagram of the NMC 103 illustrating embedded components and a logical configuration of components communicatively connected to the NMC 103 are shown in accordance with an embodiment of the present invention. The NMC 103 includes several embedded or integrated components. In particular, a network processing component 207 for sending and receiving network data to and from the computer system 100 is integrated onto the NMC 103. The network processing component 207 is communicatively connected to the system bus 112 and the network link 124. The network processing component 207 is also configured to filter, or pass, management data received over the network 105 to the microcontroller 104 via a virtual or logical connection 205. Similarly, the network processing component 207 filters data received over the network 105 that is not management data intended for consumption by the NMC 103 to an operating system 133 of the computer system 100. Additional details regarding this process will be described below.

The network processing component 207 may filter the data based on the port number which the data is directed. Alternatively, the network processing component 207 may be programmed to filter management data based upon a media access control (MAC) address allocated for management functions apart from the MAC address allocated for network communications directed to the computer system 100. Additional details regarding allocating a separate MAC address for management functions is described in the related U.S. Pat. No. 7,668,941 entitled SYSTEMS AND METHODS FOR IMPLEMENTING A TCP/IP STACK AND WEB INTERFACE WITHIN A MANAGEMENT MODULE, which is being filed concurrently herewith, and the subject matter of which is incorporated in this application by reference. It should be appreciated that the NMC 103 may be implemented as an application specific integrated circuit ("ASIC")

The NMC 103 also includes a flash ROM 201 for housing the program code executed by the microcontroller 104 and the network processing component 207. The microcontroller 104 also performs network-based functions, such as fail over, and may execute some of the network code. The flash ROM 201 stores a multithreaded operating system. It should be appreciated that some of the code may be executed from a static random access memory ("SRAM") 204, also embedded within the NMC 103, in order to optimize speed. Additional details regarding the contents of the flash ROM 201 will be described below with respect to FIG. 3.

The NMC 103 also includes an input/output module 206 for communicating with management components and other components external to the NMC 103. For instance, the input/output module 206 may include one or more general purpose input/output (GPIO) pins 208A to allow the direct connection of one or more monitoring components, or sensors. The input/output module 206 may also provide a connection to a system interface, such as the management bus (SMBUS) 130, in order to facilitate monitoring and controlling the computer system 100 components through a sensor aggregation component 202 and various sensor devices 210A-210C described below. It should be appreciated that the system interface 130 may also comprise a keyboard controller style (KCS) interface, a block transfer (BT) interface, or a server management interface chip (SMIC) interface.

The sensor aggregation component 202 may be connected to various types of sensors 210A-210C. The sensors 210A-210C measure or sense operating and performance-related parameters associated with the computer system 100. The sensor aggregation component 202 receives this information sensed by the sensors 210A-210C and provides this information to the microcontroller 104 via the system interface 130 and the input/output module 206 for analysis, and more particularly, for determination on whether an "event" is occurring within the computer system 100. An interrupt line 131 may also be provided for enabling signaling between the microcontroller 104 and the sensor aggregation component 202.

According to one embodiment, the sensor aggregation component comprises an LM-XX device from NATIONAL SEMICONDUCTOR (e.g., LM-78, LM-85, and LM-93 model logic components), but may be any type of hardware and/or software component capable of receiving sensed information and managing the delivery of this information to the microcontroller 104. Alternatively, the sensor aggregation component 202 may be operable to not only collect and forward sensed information, but also to analyze the sensed information to render advice on the parameters being monitored by the sensors 210A-210C. Even further, the sensor aggregation component 202 may be programmed with firmware operable for performing sensing and measuring functions substantially similar to those functions performed by the sensors 210A-210C. The sensor aggregation component 202 may also include GPIO pins 208B.

It should be appreciated that the sensor devices 210A-210C may be connected to the NMC 103 directly by way of the GPIOs 208A. Regardless of the implementation however, the functionality of the sensor devices 210A-210C is the same: the sensors 210A-210C sense or measure information and subsequently transmit this information to either the microcontroller 104 or a sensor aggregation component 202; if to the sensor aggregation component 202, then the information is passed by the sensor aggregation component 202 to the microcontroller 104. The microcontroller 104 then analyzes the information sensed by these sensor components 210A-210C and either (1) issues an alert that an event is occurring; and/or (2) controls operation of one or more components within the computer system 100 based on the determination that an event is taking place.

While the sensors 210A-210C are described in general terms when describing FIG. 2, it should be appreciated that these sensors 210A-210C may be digital or analog sensors that sense any type of information. For example, the sensors 210A-210C may sense, without limitation, temperature of a component (e.g., CPU 108) of the computer system 100, temperature within the chassis of the computer system 100, a voltage and/or current reading associated with a component of the computer system 100, or velocity and/or acceleration of a component (e.g., spindle motor, etc.) of the computer system 100. It is also contemplated that the sensors 210A-210C may be implemented as a software/firmware routine that senses information related to events associated with operation of either firmware or software modules implemented on the computer system 100. One such sensor 210 may be a software routine for detecting whether a particular software application program is "locked up," and therefore not operating properly.

Referring now to FIG. 3, a block diagram illustrating the contents of the flash ROM 201 will be described. As briefly described above the flash ROM 201 stores a multithreaded operating system 302, a multithreaded network program 304, and a multithreaded management program 307. The multithreaded network program 304 facilitates network communications received from and transmitted over the network 105 and is operable to multitask, i.e., execute computing tasks in multiple threads. Similarly, the multithreaded management program 307 is operable to execute computing tasks in multiple threads and facilitate the monitoring, analysis, and control of performance-related components associated with the computer system 100. The invention may be implemented by porting the multithreaded management code 307 to a network controller that includes a general-purpose microcontroller.

The multithreaded network program 304 and the multithreaded management program 307 interact on network send and receive operations that involve the management functionality of the microcontroller 104. For instance, management data received via the network link 124, such as a request for operational information on a specific component of the computer system 100, is filtered to the microcontroller 104. This receive operation requires interaction between the multithreaded network program 304 and the multithreaded management program 307. Additional details regarding the interaction the network program 304 and the management program 307 during send and receive operations will be described below with respect to FIGS. 4-5.

Referring now to FIG. 4, a process 400 illustrating the operation of an integrated network and management controller 103 with a computer system 100 will be described. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto. The process 400 is performed by the firmware executing on the NMC 103 and described above with reference to FIG. 3.

The process 400 begins at configuration operation 404 where the management program 307 establishes a communication path to the microcontroller 104 via the network processing component 207 by programming the network processing component 207 to filter management data to the microcontroller 104. As described above, the network processing component 207 may filter the data based on the port number at which the data is received or the MAC address allocated for the microcontroller 104.

Next, the process 400 continues to receive operation 405 where data is received over the network link 124. This data may be a request for operational information directed to the management module or it may be data unrelated to the management module. The process 400 then continues to filter operation 407.

At the filter operation 407, the network processing component 207 determines whether the data is management data intended for consumption by the NMC 103 or general purpose data intended for consumption by the operating system 133. If the data is not intended for the NMC 103, the process 400 continues from the filter operation 407 to send operation 410. At send operation 410, the network processing component 207 routes the data to the operating system 133 of the computer system 100 via the system bus 112. The process 400 then returns to receive operation 405 described above.

If at the filter operation 407, it is determined that the received data is intended for consumption by the NMC 103, the process 400 continues to pass operation 412. At pass operation 412, the network processing component 207 passes the data to the microcontroller 104 via the logical connection 205.

From pass operation 412, the operation flow passes to analyze operation 414. The analyze operation 414 receives and analyzes data routed or passed to the microcontroller 104. Additional details regarding the analyze operation 414 will be provided below with respect to FIG. 5. The process 400 then continues to the response operation 415. At the response operation 415, the microcontroller 104 sends a response to any active request and/or out-of-limit parameters to a requesting entity and/or reporting entity. The response may be passed to the network processing component 207 and then sent over the network link 124 and/or the response may be sent within the computer system 100 from the microcontroller 104 over the management bus 130. For instance, a requested parameter measurement may be sent to a remote computer via the network link 124. Further, a CPU 108 temperature monitored at the sensor 109 beyond a threshold limit will trigger a response from the microcontroller 104 sent to the CPU fan 106 via the management bus 130. From the response operation 415, the operation flow returns to operation 405 described above.

Turning now to FIGS. 1, 2, and 5, additional details regarding the analyze operation 414 of the process 400 will be described. The process 500 continues at receive operation 502 where data is received at the microcontroller 104 from the network processing component 207 via the logical connection 205. The data received may include a request from over the network for operational information regarding one or more components of the computer system 100.

From the receive operation 502, the process 500 continues to host receive operation 504 where data is received from the computer system 100 housing the NMC 103. Data received from the computer system 100 may also include a request for component operational information. However a request from the computer system 100 is sent to the microcontroller 104 over a system interface, such as the management bus 130 without utilizing the network processing component 207.

From the host receive operation 504, the process 500 continues to monitor operation 505, where the NMC 103 executes a monitoring cycle of the sensors 210A-210C and the sensor aggregation component 202. The NMC 103 monitors parameters of the sensors to identify any changes in parameter values. The process 500 then continues to update operation 507, where the NMC 103 updates the parameters stored in the SRAM 204.

The process 500 then proceeds to detect operations 510 and 512. At the detect operation 510, the microcontroller 104 executing the multithreaded management program 307 determines whether any requests for operational information are active. If no request is active, the process 500 continues from the detect operation 510 to return operation 517 where control is passed back to the receive operation 405 described above and illustrated in FIG. 4. If a request is active, the process 500 continues from the detect operation 510 to return operation 514 where control is passed to response operation 415 described above and illustrated in FIG. 4.

At the detect operation 512, a determination is made as to whether any of the parameters monitored during the monitor cycle are outside of designated limits thereby necessitating action on the part of the microcontroller 104. If no parameters are outside of designated limits, the operation flow continues to return operation 517 described above. If any monitored parameter is outside of designated limits, the operational flow continues from the detect operation 512 to the return operation 514 where control is passed to the response operation 415 described above.

Thus, the present invention is presently embodied as a method, apparatus, computer program product, or computer readable media encoding a computer program providing an integrated network and management controller.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An integrated network and management controller for use in monitoring operations associated with a computer system, the network and management controller comprising:
   means for performing network based functions; and means for performing management functions associated with the computer system, wherein the means for performing network based functions and the means for performing management functions are integrated into a single device;

wherein the means for performing network based functions is configured to determine whether data received over a network is intended for consumption by the network and management controller or for consumption by an operating system based on one of a MAC address allocated to the means for performing management functions and a port number at which the data is received, wherein the means for performing management functions is configured to send commands to and receive operational information from one or more components of the computer system accessible via a system interface communicatively connected to the network and management controller, the components being separate and apart from the single device, analyze the operational information received to determine whether an event is occurring, wherein the event is occurring when the operational information includes sensed parameters of the components that are outside of an expected or recommended range, and based on a determination that an event is occurring, issue an alert that an event is occurring and control operation of at least one of the components.

2. The controller of claim 1, further comprising at least one general-purpose input/output pin and a monitoring component, the input/output pin for directly connecting the monitoring component to the means for performing management functions, the monitoring component configured to monitor the parameters of the components.

3. The controller of claim 1, wherein the components of the computer system comprise at least one of a sensor aggregation component and sensors configured to sense operating and performance-related parameters associated with the computer system.

4. The controller of claim 1, wherein the means for performing network based functions is configured to filter management data received to the means for performing management functions via a logical connection internal to the controller, wherein the management data is filtered apart from general purpose data for an operating system.

5. The controller of claim 3, wherein signaling is enabled between the controller and the sensor aggregation component via an interrupt line.

6. The controller of claim 1, further comprising a memory storing at least one of a multithreaded network program, a multithreaded management program, and a multithreaded operating system for execution by the controller.

7. The controller of claim 1, further comprising a memory for storing the operational information received from the components of the computer system.

8. The controller of claim 1, wherein the means for performing network based functions and filtering management data received comprises a network processing component and wherein the means for performing management functions comprises a microcontroller further configured to perform network based functions in conjunction with the network processing component.

9. An apparatus for performing network based functions and management functions within a computer system, the apparatus comprising:

a network controller including a network processing component and a microcontroller, wherein the microcontroller is embedded within the network controller, the microcontroller configured to execute management firmware for use in performing management functions, perform network based functions in conjunction with the network processing component embedded in the network controller, wherein the network based functions include determining whether data received over a network is intended for consumption by the network controller or for consumption by an operating system based on one of a MAC address allocated to a means for performing management functions and a port number at which the data is received, communicate with components of the computer system via a system interface the components separate and apart from the network controller, receive management data filtered from the network processing component, and respond to the management data received;

wherein the components comprise a sensor aggregation component coupled to a plurality of sensors, the sensors configured to sense operating and performance-related parameters associated with the computer system and wherein the microcontroller is further configured to send commands to and receive operational information from the components of the computer system accessible via the system interface, analyze the operational information received to determine whether an event is occurring, wherein the event is occurring when the operational information includes sensed parameters of the components that are outside of an expected or recommended range, and based on a determination that an event is occurring, issue an alert that an event is occurring and control operation of at least one of the components.

10. The apparatus of claim 9, further configured to program the network controller allocate a MAC address to the microcontroller and pass the management data to the microcontroller based on the MAC address allocated to the microcontroller and associated with the management data.

11. The apparatus of claim 9, wherein the management data comprises a request for operational information and wherein the microcontroller responds to the request by sending the operational information requested over a network via the network controller.

12. The apparatus of claim 9, further configured to receive and respond to requests for operational information from the computer system via the system interface.

13. A method for operating an integrated network and management controller within a computer system, the method comprising:

establishing a communications path for management data received over a network;

receiving the management data over the network at a network processing component of the controller;

in response to receiving the management data, determining whether the management data is intended for consumption by the network and management controller or for consumption by an operating system of the computer system based on one of a MAC address allocated to a means for performing management functions and a port number at which the data is received;

in response to determining the management data is intended for consumption by the network and management controller, passing the management data from the network processing component to a microcontroller integrated onto the network and management controller via the communications path;

in response to determining the management data is intended for consumption by the operating system, passing the management data from the network processing component to the operating system;

monitoring and analyzing parameters of the computer system based on the management data passed to the microcontroller;

sending a response over the network to a requesting entity or a reporting entity based on analyzing the monitored parameters;

determining whether at least one of the monitored parameters exceeds a threshold; and in response to determining that at least one of the monitored parameters exceeds the threshold, triggering an operation of one or more components of the computer system.

14. The method of claim 13, wherein determining whether the management data is intended for consumption by the controller comprises detecting whether the communications port at which the management data is received corresponds to a designated communications port number assigned for network communications of management data.

15. The method of claim 13, wherein establishing a communication path for management data received over the network comprises allocating a unique media access control (MAC) address for the microcontroller.

16. The method of claim 15, wherein determining whether the management data is intended for consumption by the controller comprises detecting whether the management data is being transmitted to the unique MAC address allocated for the microcontroller.

17. The method of claim 13, wherein the management data comprises a request for operational information and wherein monitoring the parameters based on the management data passed to the microcontroller comprises:

receiving the request at the microcontroller;
executing a monitoring cycle; and
updating the monitored parameters based on the monitoring cycle.

18. The method of claim 13, further comprising receiving a request for operational information from the computer system via a system interface and responding to the request via the system interface.

19. The method of claim 17, further comprising:

determining whether any monitored parameters are outside of designated limits; and;

in response to any monitored parameters being outside of designated limits, sending a response to the requesting entity or the reporting entity.

20. The method of claim 13, further comprising in response to determining data received is not intended for consumption by the controller, passing the data to the operating system of the computer system.

21. A method for operating an integrated network and management controller of a computer system, the method comprising:

executing management firmware within a microcontroller embedded within the network and management controller for use in performing management functions for the computer system;

receiving management data at the microcontroller;

in response to receiving the management data, determining whether the management data is intended for consumption by the network and management controller or for consumption by an operating system of the computer system based on one of a MAC address allocated to a means for performing management functions and a port number at which the data is received;

executing a monitoring cycle that monitors parameters of computer system components;

updating monitored parameters;

determining whether a parameter is monitored outside of a designated limit; and in response to the parameter being monitored outside of a designated limit, issuing over a network from the microcontroller an alert that an event is occurring and controlling, from the microcontroller, operation of at least one component within the computer system based on the parameter being monitored outside of the designated limit.

22. The method of claim 21, further comprising sending at least one updated parameter over a network via the network and management controller in response to the management data received at the microcontroller wherein the management data comprises a request for the at least one updated parameter.

23. The method of claim 21, wherein receiving the management data comprises receiving at least one of management data from the computer system housing the network controller and management data received from over a network at the network and management controller.

* * * * *